Patented Oct. 30, 1945

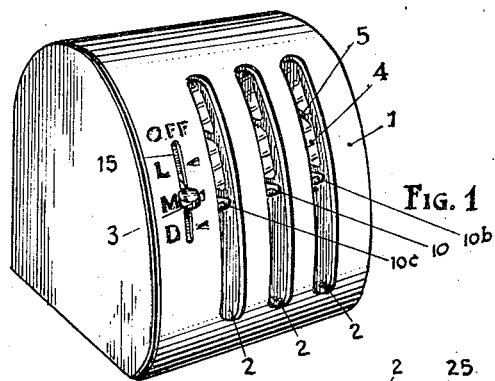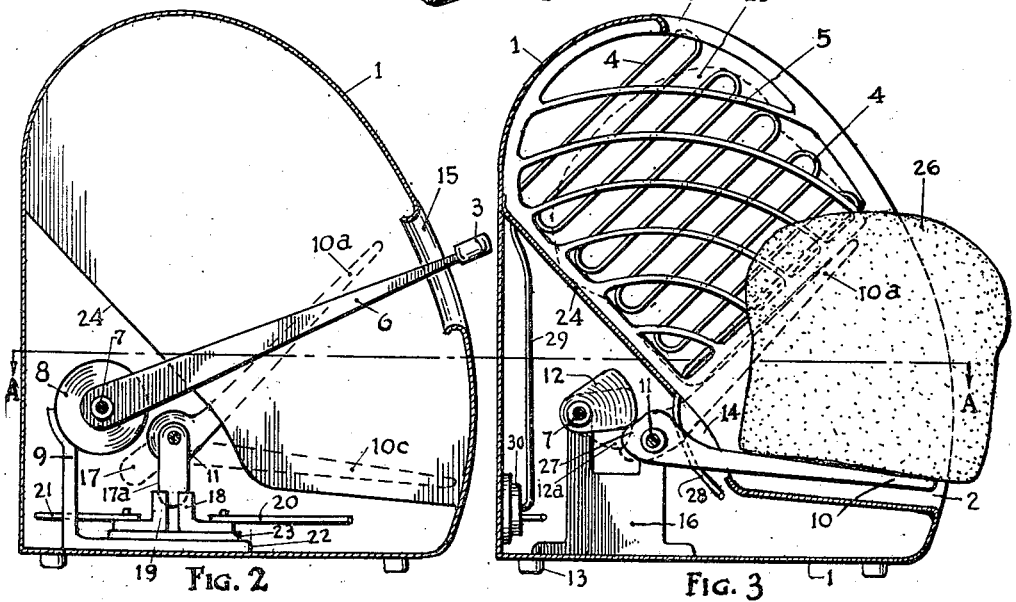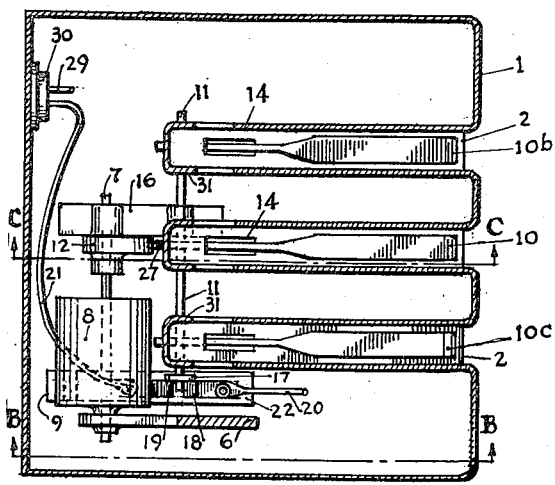

2,387,817

UNITED STATES PATENT OFFICE 2,387,817

AUTOMATIC TOASTER

Nathaniel B. Wales, New York, N. Y., assignor to Norman Bel Geddes, doing business as Norman Bel Geddes and Company, New York, N. Y.

Application October 2, 1944, Serial No. 556,722

3 Claims. (Cl. 99—327)

This invention relates to improvements in automatic toasters. The main object is to devise an automatic toaster of the simplest character, both from an automatic operational standpoint as well as the lowest possible cost of manufacture. In brief, gravity plays an important part in its cycle of automatic operation.

The sliced bread is dropped into an inclined recess as determined by the position of a pivoted finger that comprises the inwardly inclined floor of this recess and after a predetermined period of time, as is dictated by the timing device, the pivoted finger falls by gravity to preferably an outwardly inclined angle, so that the slice of bread which has now been toasted, also falls by gravity partly free of or slightly beyond the contour of the stationary toaster casing, and is perfectly accessible.

A further feature is the ease of cleaning out crumbs which normally collect in the toasting recess.

Although I have illustrated my invention as showing a toaster capable of toasting three slices simultaneously, it is to be understood that it can be made to toast one or more at the same time.

It is noted that the sequence of positions assumed by the slice before and after toasting inherently give a very compact dimensional contour to the automatic toaster.

Further objects and detail will be more specifically described and illustrated in the accompanying drawing and specifications:

Figure 1 is a perspective view of the exterior of the automatic toaster.

Figure 2 is a sectional elevation taken on line B—B in Figure 4, showing clearly the winding arm of the timer and automatic switch.

Figure 3 is a sectional elevation taken on line C—C in Figure 4, showing in detail the timer cam co-acting with the slice supporting arm and the final position of the toasted slice in relation to the case of the toaster.

Figure 4 is a plan view taken as a section on line A—A of Figures 2 and 3. Similar numerals refer to similar parts throughout the several views.

Referring to Figure 1, numeral 1 is the casing of the toaster; 2 are the vertical recesses positioned along the front of the casing; 3 is the push down winding key of the timer 8, see Figure 2, in which 6 is the lever secured to timer shaft 7 at one end and carrying the push key 3 at the other end, the lever 6 projecting through the slot 15 in case 1.

The spring actuated timing mechanism 8 is not shown in detail as it is purchased on the open market under the name of the "Minute minder" and made by the Lux Clock Company. The operative characteristics of this time are as follows:

When the operator winds the timer 8 by pushing on key 3, the further down key 3 is pushed the more the timer is wound, and the longer it takes for the lever arm 6 to slowly rise to its initial or "off" position, hence the indices "L," "M," and "D" on the front of the case in Figure 1 positioned adjacent to slot 15 signify "Light," "Medium" and "Dark," the different degrees of toasting as may be desired.

Numeral 4 indicates any suitable electrical resistance supplying the toasting heat, and is shown located on each side of the upper portion only of each recess 2, see Figure 3.

Numeral 5 is the grill interposed between the slice and the source of heat, 9 is a support for timer 8 shown integral with base 22.

The slice supporting fingers 10, see Figure 3, are shown in their two extreme positions, the elevated position 10—A and dropped position shown by numeral 10. The relative positions are controlled by the cam 12, secured to the shaft 7 of timer 8, and the co-acting contour of the inner end of finger 10 as shown by 27, see Figure 3. Finger 10 is rigidly secured to shaft 11 which is free to turn in bearings formed in the partition walls 31.

Referring to the plan view Figure 4, the other two adjacent fingers 10—B and 10—C are rigidly secured to shaft 11, so that the one cam 12 co-acting with the inner end 27, of finger 10, serves to raise or lower all three fingers, viz 10—10B and 10—C.

Numeral 14 indicates the slots through which fingers 10, 10B and 10—C project into their respective recesses 2, and are formed in the base 24 of recesses 2, 13 are suitable feet for the toasting case 1.

Numeral 17, see Figure 2, is the switch arm rigidly secured to shaft 11 and which is shown in closed position between electric terminals 18 and 19, composing the switch for the toaster, 17—A shows the open switch position which arm 17 assumes when the finger 10 has fallen to its lower position, as seen in Figure 3. The electric terminals are suitably secured to the insulation sheet 23 on pedestal 22.

Referring to the electric terminal plug 30, see Figure 4, at the rear of case 1, wire 21 therefrom, is suitably secured to switch terminal 19, and wire 20 from the other switch terminal 18 is connected to wire 26 in Figure 3, and wire 28 joins with one end of the electric resistance 4, which for purposes of description may be considered to include the several electric resistance elements adjacent each of the recesses 2, and which constitute the toasting ovens for said recesses. The other end of resistance element 4 is connected to terminal wire 29 in Figure 3, and completes the circuit through the switch when closed as is shown in Figure 2.

The operation of my invention is as follows:

If the operator desires medium toast the key 3 is depressed to index figure "M," see Figure 1. This movement winds the timer 8 to a degree which in point of time will keep the finger 10 in its elevated position 10—A, by virtue of the movement of cam 12 to position 12—A, and the cam contacting contour 27 on the end of pivoted finger 10, until the cam 12 has returned to its position, as shown in Figure 3, when finger 10 suddenly falls to the position as is shown in the same view.

When the operator pushed down the key 3, slices of bread or the like, 25 shown in dotted lines were immediately inserted in recesses 2, so that they rested on fingers 10, 10—B and 10—C in their elevated positions and were in a position to be toasted by the adjacent ovens composed of the several resistance elements 4, positioned in the upper side walls of recesses 2 behind grills 5. As and when the fingers 10 fall, as has been previously described, the slice or slices now toasted to the preselected degree fall also in recesses 2 and come to rest in accessible positions approximating that as shown in full lines 26 in Figure 3.

What I desire to protect by United States Letters Patent is encompassed in the following claims:

1. An automatic bread toaster comprising a case, a frontal recess in said case, electric toasting means adjacent to the upper portion of said recess, a bread sustaining platform pivoted in said case, and adapted to swing in an arc in said recess from a substantially horizontal position to an elevated inwardly inclined position therein, a manual control handle capable of displacement from an initial "off" position and fulcrumed on a shaft journaled in said case, a spring actuated timer for returning said control handle at a predetermined rate of return to said "off" position and cam means secured to said horizontal shaft and adapted to elevate by engagement therewith said bread sustaining platform to that extent that bread thereon is opposite said toasting means in said recess, when said control handle is displaced from said "off" position and to disengage itself from said elevated platform when said control lever has returned to said "off" position and electric switch means actuated by said control handle to de-energize said electric toasting means when said control handle is in its "off" position.

2. An automatic toaster comprising a case, a frontal recess in said case, electric toasting elements positioned adjacent to said recess; a platform, for bread or the like, free to rotate about a horizontal axis within said recess; a control handle, accessible to the front of said case; spring return means to return said control handle to an initial "off" position, from any manual displacement therefrom; timing means to regulate the rate of return of said control handle from any manual displacement from its "off" position; cam means, operable by displacement of said control handle from its "off" position, to elevate said platform and the slice of bread, manually placed thereon, from an initial, substantially horizontal position, to an elevated, inwardly inclined position in said recess, opposite said toasting elements, said cam means being of such contour, that said platform is free to fall to its initial substantially horizontal position when said control handle has reached the said "off" position, said bread having been toasted while it is in said elevated position, and electric switch means, actuated by said control handle, to de-energize said toasting elements when said control handle is in its "off" position.

3. An automatic electric toaster, adapted to eject, by a predetermined drop, a slice of toasted bread, or the like, to a position accessible to the exterior of the toaster case, comprising a case having a vertical recess in the frontal portion of same; electric toasting means adjacent to the upper portion of said recess; a bread sustaining finger pivoted in the rear of said case, and adapted to swing in an arc in said recess, from a substantially horizontal position, to an inwardly inclined elevated position therein; a manual control handle, capable of displacement from an initial "off" position, and fulcrumed on a shaft journaled in said case; a spring actuated timer, for returning said control handle at a predetermined rate of return to said "off" position; and cam means, secured to said shaft and adapted to elevate, by contact, said bread sustaining finger, together with a slice of bread manually placed thereon, to a position opposite said electric toasting means, when said control handle is displaced from its "off" position, and to completely disengage itself from contact with said bread sustaining finger when said control handle has returned to said "off" position, and to permit the now toasted slice of bread, resting on said bread sustaining finger to fall away from said toasting means and come to rest in an accessible position at the bottom of said recess.

NATHANIEL B. WALES.